Figure 1:
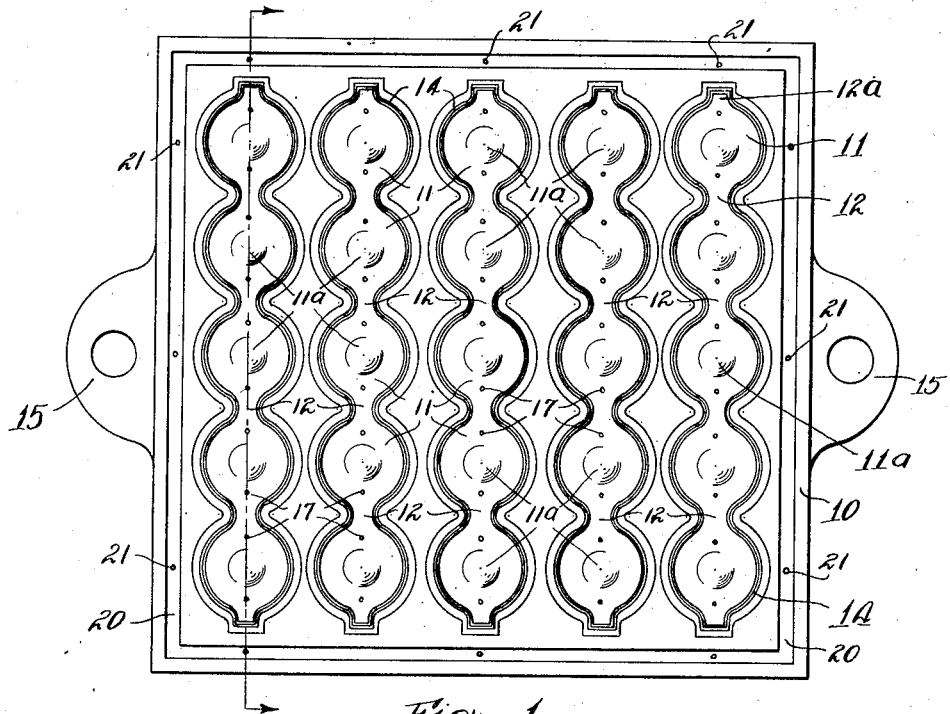

Sept. 15, 1925.                                                    1,553,554
F. T. ROBERTS
METHOD OF MAKING HOLLOW RUBBER ARTICLES
Filed Aug. 5, 1922                    3 Sheets-Sheet 1

INVENTOR
Fred Thomas Roberts
By Davis & Macklin
ATTYS

Sept. 15, 1925.
F. T. ROBERTS
1,553,554
METHOD OF MAKING HOLLOW RUBBER ARTICLES
Filed Aug. 5, 1922
3 Sheets-Sheet 2

INVENTOR
Fred Thomas Roberts
By Bates & Macklin,
ATTYS.

Sept. 15, 1925.

F. T. ROBERTS 1,553,554

METHOD OF MAKING HOLLOW RUBBER ARTICLES

Filed Aug. 5, 1922  3 Sheets-Sheet 3

INVENTOR
Fred Thomas Roberts
BY Baker & Macklin,
ATTYS.

Patented Sept. 15, 1925.

1,553,554

UNITED STATES PATENT OFFICE.

FRED THOMAS ROBERTS, OF UPPER MONTCLAIR, NEW JERSEY, ASSIGNOR TO PARAMOUNT RUBBER COMPANY CONSOLIDATED, INC., OF PHILADELPHIA, PENNSYLVANIA, A CORPORATION OF DELAWARE.

METHOD OF MAKING HOLLOW RUBBER ARTICLES.

Application filed August 5, 1922. Serial No. 579,937.

*To all whom it may concern:*

Be it known that I, FRED THOMAS ROBERTS, a citizen of the United States, residing at Upper Montclair, in the county of Essex and State of New Jersey, have invented a certain new and useful Improvement in Methods of Making Hollow Rubber Articles, of which the following is a full, clear, and exact description, reference being had to the accompanying drawings.

This invention relates to a method of making hollow rubber articles, particularly where sheets of plastic rubber are forced into mold cavities and the cavities brought together to sever the articles from the sheets and form so-called "biscuits."

The object of the present invention is to provide a process adapted to form bulbs in a large number simultaneously, and more particularly to form a series of such articles so connected that pellets or plugs of rubber may be placed at connecting necks during the forming and before bringing the mold parts together, so that the bulbs formed may be easily severed between any two articles, leaving each adjacent bulb end closed. The process also lends itself readily to the completion of the article by vulcanization, and forms bulbs which may be opened for connection with a hose, syringe tube or the like, after completion by forming a hole through the plug closed end or ends.

Further objects of the invention are to provide for the forming of reinforced ends of syringe bulbs by the addition in that region of rubber which shall be fully in contact with the rubber sheet whereby the trapping of the air behind the reinforce or around it will be avoided. The process and apparatus may be more fully understood with reference to the drawings, which illustrate the bulbs and suitable molds and apparatus for carrying out the process of manufacturing them and the following description refers to the drawings by the use of reference characters, the essential characteristics of the method being set forth in the claims.

Figure 2:
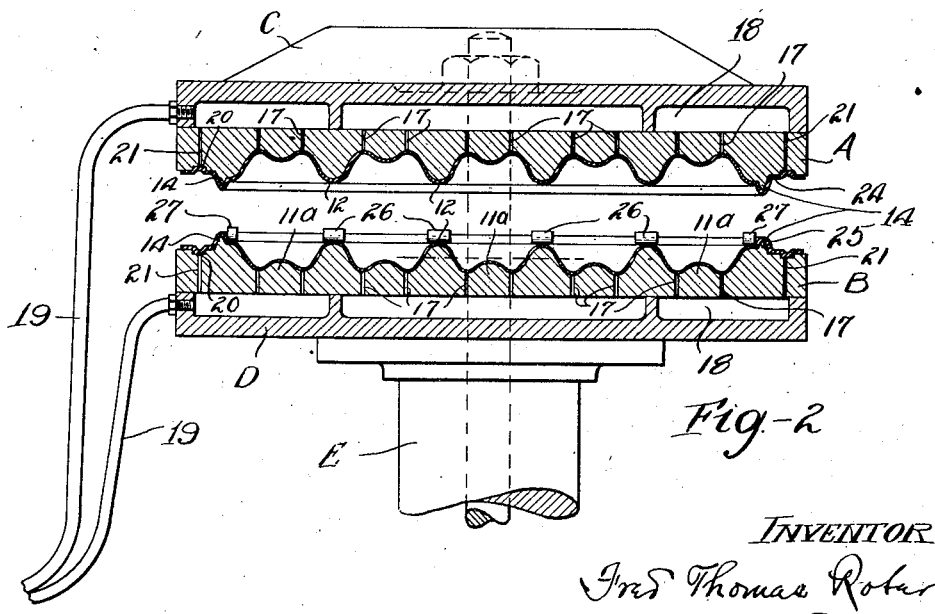
Figure 3:
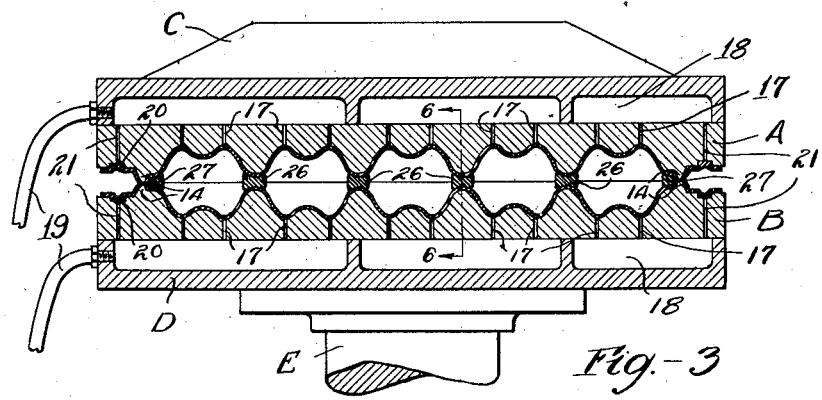
Figure 4:
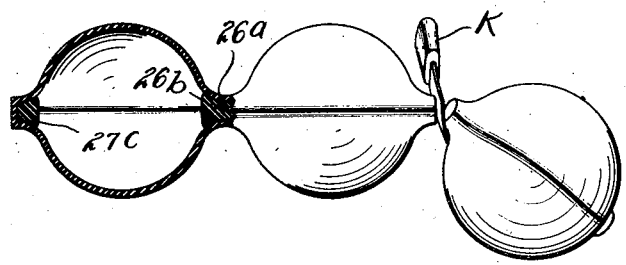
Figure 5:
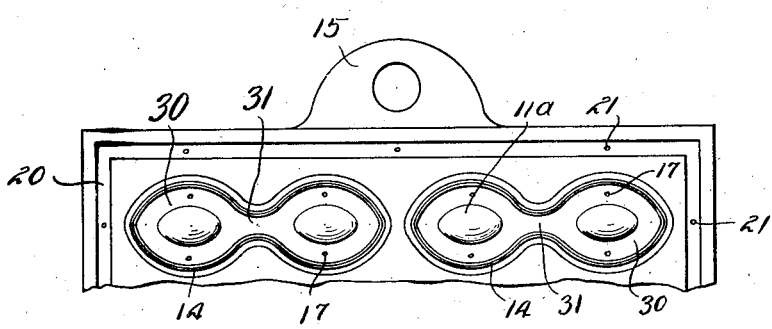
Figure 6:
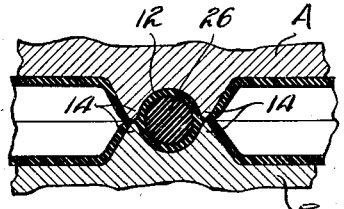
Figure 7:
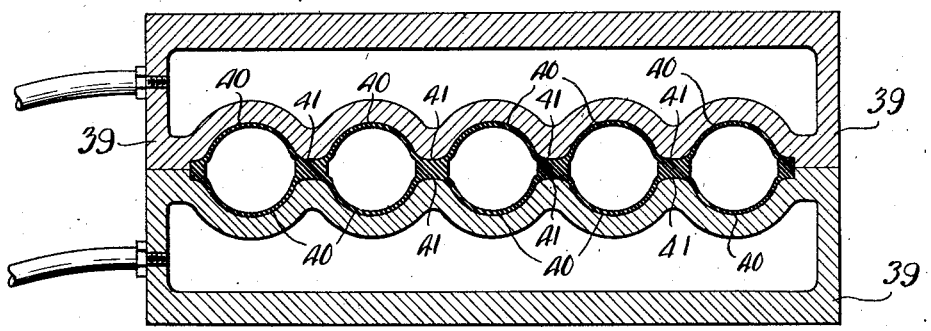
Figure 8:
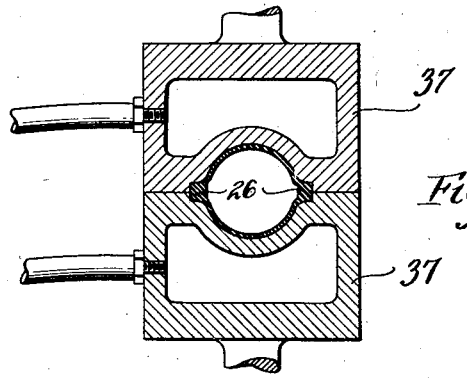
Figure 9:
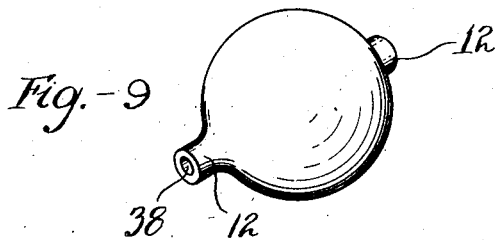

In the drawings, Fig. 1 is a plan view of a mold showing a series of rows of cavities; Fig. 2 is a cross section of a pair of such molds shown as carried in a suitable press for bringing them together; Fig. 3 is a similar view of the same showing the parts brought together; Fig. 4 is a partial sectional view showing a row of bulbs as taken from the molds, being severed at the point of connection between the bulbs; Fig. 5 is a modified form of mold in which bulbs having one end only adapted to be opened may be formed by arranging the connection so that the bulbs are arranged in pairs; Fig. 6 is a cross sectional view taken along the line 6—6 of Fig. 3; Fig. 7 is a cross sectional view of a vulcanizing mold for curing the articles while joined; Fig. 8 is a cross sectional view of a mold adaptable for the curing of the individual articles, and Fig. 9 is a perspective view of the finished article.

The present invention is an improvement over other methods I have used, such for example as disclosed and claimed in my prior Patent No. 1,310,442 issued July 22, 1919. Previously I formed the ends of syringe bulbs by the use of metallic mandrels which served as a core for rubber rings or hollow plugs in forming the interior of the converging ends of the bulb. The use of the core, while satisfactory in many respects, used single disconnected cavities and at times resulted in the formation of air pockets between the reinforcements and the wall of the article.

I have found that a more uniform article may be manufactured with greater rapidity by the use of molds, in which uncured rubber stock, which is sufficiently thin to permit the forcing of the rubber stock into the mold cavities pneumatically, may be utilized to form a plurality of bulbs with the neck portions joined; the contour of the mold cavities being such that the part of the cavities which forms the neck extend from one major cavity to an adjacent cavity and suitable reinforces are inserted in such necks. These reinforces may be of any suitable material or shape; for instance they may be rubber in the form of pellets or plugs. These reinforces comprise the end closures of the bulbs and may be placed on the rubber sheets in juxtaposition to these communicating portions of the mold cavities; the size of the reinforce in relation to the space to be filled being such that when the upper mold member carrying a sheet pneumatically retained thereon is superposed upon a similar bottom mold, the reinforce will be firmly pressed between the upper and lower sheets; each reinforce comprising an end or neck closure for two bulbs when the bulbs are finally severed or parted after the curing operation.

Referring first to Figs. 1 and 2, 10 indicates a mold in the nature of a platen having a series of mold cavities 11 with minor cavities 12 communicating from one major cavity to the other. As shown in Fig. 1, there are five major cavities 11 with four intermediate connecting cavities 12 extending from one end of the mold to the other; there being five rows of such cavities, each row being independent of the other. Each row of cavities is surrounded by a continuous severing ridge 14 whereby the formed articles are severed from the sheets with the neck portions integral, the contour of these cavities being such that a plurality of joined bulbs such as is illustrated in Fig. 4 may be formed.

Each bulb tapers at opposite ends to contracted neck portions which, when the bulb is completed are provided with openings for the reception of connecting or coupling means for the attachment of connecting tubes or other devices which the bulb is desired to operate.

As illustrated in Fig. 2, the complete mold comprises an upper mold member A and a bottom mold member B having cavities corresponding to the mold member shown in Fig. 1; the upper and lower mold members each being shaped to form one half of the bulb walls. A convenient means for supporting the molds may comprise a press for forcibly bringing them together and separating them after formation of the articles. One form of such a press is illustrated in my Patent No. 1,201,502 issued October 17, 1916. The molds are provided with suitable bored bearing lugs 15 for suitably aligning the mold members relative to each other when secured to the upper and lower supporting members C and D of a mold press, whereby cutting edges or ridges 14 of the respective mold members may be accurately superposed when the molds are brought together. In the present instance the bottom mold B and support D are moved upwardly and downwardly by a ram or piston operated by fluid pressure or any other suitable means.

To cause the rubber stock or sheets to take the conformation of the mold cavities before the molds are brought together, provision is made for pneumatic action upon the stock sheets as will now be set forth. A number of small passageways 17 are formed in the mold which provide communication between the major mold cavities and vacuum chambers 18 formed in the supporting members C and D. These chambers 18 are connected to a vacuum pump through flexible conduits 19. Clamping grooves 20 completely surround the mold cavities and passageways 21 and also communicate with the vacuum chambers 18. The pneumatic action upon the sheets when the chambers 18 are exhausted is such that the sheets are first clamped around the perimeters of the molds by the vacuum grooves 20 and are then forced into the cavities.

In forming a hollow article such as rubber bulbs, syringe bulbs and the like, the drawing of the sheet stock in the cavities causes the stock to be stretched and thinned in the central region of the bottom of the cavity, thus causing an uneven thickness in the wall. This may be overcome by the provision of hump portions 11$^a$ which extend upwardly from the base of the cavity. The action and the result obtained by providing these humps in the cavities is described in my method patent hereinbefore referred to.

In Fig. 6, I show a cross section taken through the neck forming portions of the molds. This figure illustrates the relation of the sheet rubber stock to the plugs when the mold members are superposed.

The carrying out of the steps of my process are as follows:—

The supporting members C and D, carrying the upper and lower mold members, are drawn apart by mechanical means, as shown in Fig. 2, and a sheet of raw rubber stock 24 is placed over the face of the upper mold member; the operator pressing the sheet around the margins thereof into the groove 20, thus effectively sealing the entire face of the mold by the action of the vacuum present in the chamber 18. The mold cavities will be rapidly exhausted, thus creating an air pressure on the outer face of the rubber stock and causing it to be pressed firmly and uniformly into engagement with all of the surfaces of the mold cavities as illustrated in Fig. 2. A second sheet of raw rubber stock is then placed upon the lower mold member B in the same manner. Rubber plugs 26 of a proper size may then be placed in the small troughs formed by the sheet rubber being drawn into the minor communicating cavities 11; the plugs being of sufficient length to extend or project a slight distance into the major cavities. Plugs 27, having a length substantially equal to one half of the length of the plugs 26 are then positioned on the rubber stock in juxtaposition to the contracted portions 12$^a$ of the end cavities. The diameter of these plugs may be slightly greater than the distance between the bottoms of the cavities 12 when the molds are superposed, whereby the plugs will be firmly pressed into engagement with the portions of sheet stock which ultimately form the neck of the bulb.

Before closing the rows of bulbs by bringing the molds together any suitable expansible material, such as an ammonia powder or water may be placed in the rubber lined cavities of the bottom mold so that when finally subjected to heat in the vulcanizing mold, proper internal pressure may be created to cause the articles to be expanded against the vulcanizing mold surfaces in a manner which is well known in the art. The mold members may then be brought together as illustrated in Fig. 3, causing a severing of the molded portions from the unmolded portions of the sheet stock as well as effecting a joining of the upper and lower molded sheet portions, thus forming unvulcanized rubber biscuits. The plugs 26 and 27 will thereby be in a compact, compressed relation between the joined halves of the neck portions of the connected bulbs or biscuits thus formed. As the plugs and sheet stock are both formed of raw rubber, this compression unites these parts firmly.

The mold members may then be separated and the rows of joined bulbs or biscuits removed therefrom, after which the bulbs may be severed and placed in the cavities of a curing mold 37 shown in Fig. 8, the cavities of the curing molds, however, having the contour of the completed bulb.

If desired, the contour of the neck forming cavities of the curing mold may be more contracted than the neck forming cavities of the biscuit molds to cause a further compressing of the rubber comprising the neck wall upon the plugs, thus insuring a permanent joining of the plug to the wall of the bulb when in the curing mold.

In the formed article the plugs have the shape shown in Fig. 4, wherein it will be noted that the central portion 26ª has been considerably reduced in diameter in relation to the end portions 26ᵇ, the shape of the minor mold cavities being such as to compress the central portions of the plugs before the end portions thereof are compressed. It follows that the air is progressively forced from between the molded portions of the sheets adjacent the middle of the plugs toward the ends of the plugs as the molds are brought together.

After the bulbs are properly vulcanized and removed from the curing mold, they may then be drilled or bored through the plug portions to obtain the desired opening 38, (see Fig. 9) for the adaptation of the bulb to the device with which it is to be associated.

If it is desired to manufacture bulbs with only one neck portion thereon, a mold (a portion of which is illustrated in Fig. 5) may be used wherein two major cavities 30 are connected by an intermediate cavity 31. The arrangement of the clamping groove, connecting passageways, severing ribs, etc., being substantially the same as illustrated in the construction of the mold shown in Fig. 1. The joined biscuits may be vulcanized if desired before the severing operation, in which case a parted curing mold 39 (Fig. 7) having major cavities 40 and communicating cavities 41 of a contour conforming to the shape of the finished article, may be used. I find, that there is an advantage in the saving of time effected by removing the joined biscuits and vulcanizing them while so joined and subsequently severing them into individual articles; on the other hand, there is an advantage in cutting the biscuit apart and vulcanizing the units independently as it produces a more accurate end on the article than is likely to result where it is cut after vulcanization. Moreover, it is easier to place individual units in a vulcanizing mold. It is to be understood that my process covers the operation irrespective of the order in which the steps of severing and vulcanizing are performed.

The process described has great advantages of manufacture in that the molds used in carrying out the steps of the process are of such simple construction that they may be cast with the edge or severing rib surrounding the cavities of the mold. Furthermore, by forming a plurality of bulbs with joined neck portions sealed by rubber plugs, uniformity in the manufacture of the bulbs is obtained due to the fact that the possibility of forming air pockets between the plugs and the molded sheets in the biscuit-forming and curing stages is eliminated. A further advantage is to be found in joining the pneumatically molded halves of the biscuit in a central plane extending through the neck portions of the bulb as the mold cavities have less depth than would otherwise be necessary, thus further promoting the pneumatic action of forcing the sheet rubber to conform to the surfaces of the mold cavities. This likewise results in the rubber sheets being more firmly pressed into contact with the molding surfaces of the cavities as less stretching of the rubber is required to conform thereto. These combined advantages serve to also prevent the trapping of air bubbles between the surface of the mold and the molded sheets.

The process while simple in nature, nevertheless results in the production of hollow rubber articles such as syringe bulbs with the ends or necks thereof reinforced by rubber pellets or plugs which are uniformly vulcanized to the converging walls of the bulb neck. If it is desired, the plugs or pellets may be formed of a rubber composition which is different than the rubber composition comprising the bulb proper; the plug composition may be such, for instance, that the plug will maintain a permanent seal with the tube, syringe or other device to which it is attached; or may be of a nature to resist oily medicines (such as are used in atomizers) or other destructive liquids which freqently destroy the sealing contact of the bulb with the tube.

I claim:

1. The method of making hollow rubber articles comprising seating sheet rubber stock in the connected cavities of two co-operating molds, the cavities being surrounded by a cutting edge, placing portions of rubber in the form of plugs in contact with the molded rubber which lines the connecting portions between the cavities, bringing two cavities thus lined into coaction to enclose the plugs and to cut off the material entirely around the exterior of the article, and subsequently severing the articles intermediate the ends of the plug portions.

2. The method of making a plurality of hollow rubber articles comprising seating sheet stock in connected cavities of cooperating molds, placing reinforcing material on one of the seated rubber sheets intermediate the cavities, and bringing the rubber-lined cavities into superposed relation whereby the rubber stock intermediate the mold cavities will be brought into compressed relation with the reinforcing material and thereby effect the formation of a series of connected hollow rubber articles with the reinforcing material comprising partitions therebetween.

3. The method of forming hollow articles consisting of seating sheet stock in cavities of the mold members, there being narrow connections between major cavities, placing additional rubber on the rubber stock between the major cavities, and bringing the mold members into superposed relation to cause the portions of the rubber seated in the cavities to unite and portions of the seated rubber to be compressed upon the added rubber in the narrow connection.

4. The method of making hollow rubber articles provided with converging neck portions, consisting of pneumatically seating sheet rubber stock in connected cavities of mold members, the cavities substantially conforming in contour to the contour of the articles to be formed, the neck forming portions of the cavities comprising a minor cavity extending from one major cavity to another, and the minor and major cavities being surrounded by a continuous cutting edge, placing rubber in the depressions formed by the sheet of stock conforming to the outline of the minor cavities, and bringing the mold members together with the cavities and cutting edges thereof in superposed relation to effect a compressing of the neck portions of the formed rubber upon the added rubber.

5. The process of making hollow rubber articles consisting of forming the articles as joined units with solid rubber pellets enclosed within connected portions of the articles, and then separating the articles into units by severing the articles at the neck portions thereof.

6. The process of making hollow rubber articles consisting of seating sheet stock in the cavities of two mold members, placing in one of the mold members after the stock is seated therein a plurality of rubber plugs, bringing two members together to cause the plugs to be snugly embraced by the seated rubber stock in both mold members and thus obtaining solid walls between the interiors of the joined hollow rubber articles thus formed, and subsequently separating the hollow articles into units by severing the rubber plugs and neck portions of the articles intermediate the ends of the plugs.

7. The process of making hollow rubber articles consisting of pneumatically seating sheet stock in the joined cavities of two mold members, placing in one of the mold members rubber adjacent the joined portions of the cavities after the stock is seated therein, bringing the two members together to cause the inserted rubber to be snugly embraced by the seated rubber stock in the joined cavities and to effect an adhesion of the molded rubber stock to the inserted rubber, and subsequently separating the rubber articles into units by severing the rubber plugs and surrounding stock intermediate the plug ends.

8. The process of making syringe bulbs and similar articles which includes the steps of seating stock for the articles in the cavities of mold members, there being major cavities connected by minor cavities, placing rubber plugs upon these portions of the sheet stock seated in said minor cavities, said plugs being greater in dimension than the minor cavities after being lined by the sheet stock, bringing the mold members with the cavities into superposed relation to form the articles in rows of joined units and thereafter separating the units into individual articles by severing the reduced portions of the articles formed by the molding action of the minor cavities, the severing being effected mid-way of adjacent units.

9. The process of making syringe bulbs and similar articles consisting of pneumatically seating stock which forms the walls of the articles in mold cavities, there being major cavities connected by minor cavities, placing rubber upon those molded portions of the rubber stock which is seated in the minor cavities, superposing a similarly formed mold member with seated stock thereon upon the first named mold member to form the articles with neck portions thereof integral, and subsequently severing the neck portions of the articles to separate the articles into units.

10. The process of making syringe bulbs and similar articles consisting of pneumatically seating sheet rubber in mold cavities which are connected by minor cavities formed in a mold member, the sheet rubber stock being adapted to form connected longitudinal sections in the bulbs, placing rubber in the form of solid pellets upon the seated rubber stock adjacent the minor cavities, there being shorter plugs placed on the sheet rubber at the ends of those cavities which are adjacent opposite sides of the mold, bringing a second group of cavities formed in a mold member and similarly lined with rubber stock into conjunction with the cavities of the first mentioned mold member, severing the surplus rubber stock around the exterior of the connected mold cavities by bringing the mold members together under pressure, separating the articles into units by severing the rubber pellets intermediate their ends and the adhering sheet stock, vulcanizing them and subsequently boring desired openings in the vulcanized pellets.

11. The process of making syringe bulbs or similar articles consisting of seating rubber sheet stock in aligned mold cavities, there being major cavities for forming the bodies of the articles and minor cavities connecting adjacent major cavities and adapted to form integral reduced portions comprising the necks of the article, placing another sheet of rubber stock over a similar mold member, there being a continuous severing edge surrounding each series of connected cavities, inserting rubber upon the molded sheet stock adjacent the ends of each row of cavities, bringing the mold members together with the cavities and severing edges thereof in superposed relation, exerting pressure thereon to cause a severing of the molded portions of the sheet stock from the sheet proper and to effect a joining of the halves of the articles which are molded by the seating of the rubber stock in the cavities and with said end inserts, whereby the interiors of the hollow articles are sealed, and separating the articles into units by separating the intermediate connecting portions.

12. The process of making syringe bulbs or similar articles consisting of seating rubber sheet stock in aligned mold cavities, there being rows of major cavities for forming the bodies of the articles and minor cavities connecting adjacent major cavities and adapted to form integral reduced portions comprising the necks of the articles, placing another sheet of rubber stock over a similar mold member, placing rubber plugs upon the molded sheet stock adjacent the ends of each row of cavities, bringing the mold members together with the cavities thereof in superposed relation, exerting pressure thereon to cause a joining of the halves of the articles which are molded by the seating of the rubber stock in the cavities of the mold members and with said end plugs, whereby the interiors of each row of hollow articles are sealed, and finally separating the articles into units by separating the intermediate connecting portions.

13. The process of making syringe bulbs or similar articles consisting of seating rubber sheet stock in aligned mold cavities of mold members, there being major cavities for forming the bodies of the articles and minor cavities connecting adjacent major cavities and adapted to form integral reduced portions comprising the necks of the articles, there being continuous severing edges on the mold members surrounding each series of connected cavities, placing an ammonium salt or other expanding medium upon the molded sheet, positioning rubber reinforcing material upon the molded sheet stock adjacent the ends of the rows of cavities of one of the mold members, bringing the mold members together with the severing edges thereof in superposed relation, exerting pressure thereon to cause a severing of the molded portions of the sheet stock from the sheet proper and cause the severed stock to adhere to the embraced reinforcing material, whereby the interiors of the rows of hollow articles are sealed, separating the articles into units by separating the intermediate connecting portions, and vulcanizing the joined articles with the end plugs in place and with the expanding medium entrapped therein.

14. The process of making syringe bulbs or similar articles consisting of forming the articles in longitudinally connected halves about enclosed longitudinally disposed cylindrical pellets, separating the articles so formed into units by severing the intermediate connecting portions, then placing the articles so formed with the plugs therein in a vulcanizing mold, the vulcanizing mold having cavities adapted to exert additional pressure upon the rubber stock adjacent the plugs.

15. The process of making syringe bulbs or similar articles consisting of seating rubber sheet stock in cavities of two mold members, there being major cavities adapted to form a half of an article divided longitudinally, and minor cavities connecting the major cavities and adapted to form neck portions on the articles, placing plugs of rubber on the sheet stock adjacent the minor cavities with the ends thereof extending toward the major cavities, bringing a similarly formed member with sheet stock seated in cavities thereof into conjunction with the first named mold member to form a seam extending longitudinally of a plurality of connected articles, severing the articles into units, and transferring the units to vulcanizing molds also having major cavities and minor cavities, each combined cavity corresponding to half the article divided transversely, and vulcanizing them.

16. The method of making hollow articles of plastic material comprising seating sheet stock in connected cavities of two cooperating molds, the cavities being embraced by cutting edges, placing reinforcing material in contact with the material which lines the connecting portions between the cavities, bringing two cavities thus lined into coaction to enclose the reinforcing material and to cut off the material about the exterior of the article, and subsequently severing the articles adjacent the reinforced portions.

17. The method of making hollow rubber articles by means of a pair of mold members, each having cavities formed in rows, the end portions of each cavity being reduced in cross section and formed in common with the end portions of adjacent cavities, comprising seating sheet rubber stock in the cavities with longitudinal sections thereof extending from one cavity to another below the face of the mold, applying reinforces within the connecting portions and bringing the mold members together.

18. The method of making hollow rubber articles which includes the steps of molding a row of hollow articles with integral neck portions formed intermediate the body portions of the articles, severing the articles through the solid neck portions to make closed units and subsequently vulcanizing the severed articles in a curing mold.

19. The method of forming hollow rubber articles which includes the steps of seating sheet stock in cavitary mold members, placing a piece of vulcanizable rubber within the seated stock, bringing the mold members together to sever the seated portions of the rubber from the sheet stock with intermediate portions of the stock embracing such placed piece, and at the same time joining the body portions of the articles together, and thereafter cutting through such embracing portion and the embraced piece.

20. The method of making hollow rubber articles which includes the steps of molding a plurality of hollow bodies with solid connecting neck portions of reduced cross-sections between adjacent bodies and severing the article through such solid necks.

21. The method of making hollow rubber articles which includes the steps of molding a row of hollow articles with solid neck portions formed intermediate the body portions of the articles, severing the articles through the solid neck portions to make closed units, and subsequently vulcanizing the severed articles in a curing mold.

22. The method of forming hollow rubber articles which includes the steps of seating sheet stock in cavitary mold members, bringing the mold members together to sever the seated portions of the rubber from the sheet stock with intermediate portions of the stock connecting the body portions of the articles formed by bringing the mold members together, thus producing a series of connected closed units, severing the connected articles thus formed, and securing the severed articles in vulcanizing molds.

23. The method of making hollow rubber articles which includes the step of molding a plurality of hollow articles with integral neck portions formed by a plug intermediate the body portions of adjacent articles, separating the articles into units by severing the plugs intermediate their ends and subsequently vulcanizing the separated units with the severed plug portions sealing the neck portions of the units.

24. The method of making hollow rubber articles comprising seating sheet rubber stock in the cavities of two cooperating molds, the cavities being surrounded by a cutting edge, placing rubber plugs in contact with those portions of the molded rubber which lines the connecting portions between the cavities, bringing the cavities together to enclose the plugs and to cut off the sheet material entirely around the exterior of the articles thus formed, removing the connected articles from the forming mold, severing the articles into units intermediate the ends of the plugs and thereafter vulcanizing the articles with the severed plug portions sealing the neck portions thereof.

25. The process of making hollow rubber articles consisting of pneumatically seating sheet stock in joined cavities of two mold members, placing in one of the mold members rubber pellets adjacent the joined portions of the cavities after the stock is seated therein, bringing the two members together to cause the pellets to be snugly embraced by the seated rubber stock in the joined cavities and to effect an adhesion of the molded rubber stock to the plugs, removing the joined articles thus formed, severing the joined articles intermediate the ends of the pellets and subsequently vulcanizing the separated articles with the severed pellet portions in place.

26. The process of making syringe bulbs and similar articles consisting of pneumatically seating stock which forms the walls of the articles in mold cavities, there being major cavities connected by minor cavities, placing rubber pellets upon those molded portions of the rubber stock which is seated in the minor cavities, superposing a similarly formed mold member with seated stock thereon upon the first named mold member to form the articles with integral connecting neck portions, removing the connected articles from the molds, severing the articles through said pellets and finally vulcanizing the separated articles in curing molds with the severed portions of the pellets in place.

In testimony whereof, I hereunto affix my signature.

FRED THOMAS ROBERTS.